(12) United States Patent
Lessmann et al.

(10) Patent No.: US 9,178,760 B2
(45) Date of Patent: Nov. 3, 2015

(54) METHOD AND APPARATUS FOR CONFIGURING NETWORK NODES

(75) Inventors: Gunnar Lessmann, Niehheim (DE); Joerg Jeschin, Einbeck (DE)

(73) Assignee: Phoenix Contact GmbH & Co. KG (DE)

( * ) Notice: Subject to any disclaimer, the term of this patent is extended or adjusted under 35 U.S.C. 154(b) by 199 days.

(21) Appl. No.: 13/879,540

(22) PCT Filed: Oct. 12, 2011

(86) PCT No.: PCT/EP2011/005117
§ 371 (c)(1),
(2), (4) Date: Jun. 25, 2013

(87) PCT Pub. No.: WO2012/052130
PCT Pub. Date: Apr. 26, 2012

(65) Prior Publication Data
US 2013/0265908 A1  Oct. 10, 2013

(30) Foreign Application Priority Data

Oct. 18, 2010  (DE) .......................... 10 2010 048 588

(51) Int. Cl.
*H04L 12/24* (2006.01)
*H04L 12/403* (2006.01)
*H04L 12/40* (2006.01)

(52) U.S. Cl.
CPC .......... *H04L 41/0806* (2013.01); *H04L 12/403* (2013.01); *H04L 41/0846* (2013.01); *G05B 2219/25067* (2013.01); *H04L 2012/4026* (2013.01); *H04L 2012/40221* (2013.01)

(58) Field of Classification Search
None
See application file for complete search history.

(56) References Cited

U.S. PATENT DOCUMENTS

| 5,828,851 | A | * | 10/1998 | Nixon et al. ................. 710/105 |
| 6,266,726 | B1 | * | 7/2001 | Nixon et al. ................. 710/105 |
| 6,449,715 | B1 | | 9/2002 | Krivoshein |
| 2003/0061323 | A1 | | 3/2003 | East et al. |
| 2003/0236875 | A1 | | 12/2003 | Green et al. |
| 2004/0103176 | A1 | | 5/2004 | Schmid |

(Continued)

FOREIGN PATENT DOCUMENTS

| DE | 10356348 A1 | 6/2005 |
| DE | 102004062432 A1 | 6/2006 |

(Continued)

OTHER PUBLICATIONS

"Related German Patent Application No. 10 2010 048 588.8 Office Action", Jun. 28, 2011, Publisher: DPMA, Published in: DE.

(Continued)

*Primary Examiner* — Jackie Zuniga Abad
*Assistant Examiner* — Latresa McCallum
(74) *Attorney, Agent, or Firm* — Kaplan Breyer Schwarz & Ottesen, LLP

(57) ABSTRACT

In order to configure network nodes as part of the planning and setting-up of an in particular real-time-based and isochronous data transmission between the network nodes, a method and apparatus are proposed, wherein a node is connected via the network to the apparatus which is programmed in such a way that, in response to at least one item of configuration-related information specified by an operator, it generates a set of configuration data which are necessary for configuring at least the one node and transmits at least a subset of this generated set of configuration data to the node via the network.

14 Claims, 5 Drawing Sheets

(56) References Cited

U.S. PATENT DOCUMENTS

| | | | |
|---|---|---|---|
| 2004/0258015 A1 | 12/2004 | Bruckner et al. | |
| 2005/0243739 A1* | 11/2005 | Anderson et al. | 370/254 |
| 2007/0025355 A1 | 2/2007 | Cohen et al. | |
| 2008/0109548 A1 | 5/2008 | Okada et al. | |
| 2008/0281947 A1 | 11/2008 | Kumar | |
| 2008/0307406 A1* | 12/2008 | John et al. | 717/171 |
| 2009/0019146 A1 | 1/2009 | Tegnell et al. | |
| 2009/0228611 A1 | 9/2009 | Ferguson et al. | |
| 2010/0131941 A1 | 5/2010 | Hnida et al. | |
| 2010/0205281 A1 | 8/2010 | Porter et al. | |

FOREIGN PATENT DOCUMENTS

| | | |
|---|---|---|
| DE | 102006003167 B3 | 8/2007 |
| DE | 602005002585 T2 | 6/2008 |
| WO | 2008031695 A1 | 3/2008 |

OTHER PUBLICATIONS

Yolaine Cussac, "International Patent Application #: PCT/EP2011/006117 Translation of International Preliminary Report on Patentability", Apr. 23, 2013, Publisher: PCT, Published in: EP.

Herve Dupuis, "International Patent Application No. PCT/EP2011/005117 International Search Report and Written Opinion", Apr. 11, 2012, Publisher: PCT, Published in: NL.

"EP Office Action", issued in co-pending European Patent Application No. 11 773 681.9; issued on Jun. 22, 2015.

Dermla, et al., "Ein globale Projektier- und Managementwerkzeug fr lokale Netze" (translation: "A Global Configuration and Management Tool for Local Area Networks"), "ATP Automatisierungstechnische Praxis" (Translation: "ATP Automation Technology in Practice"), May 1, 1990, pp. 258-261, vol. 32, No. 5, Publisher: R. Oldenbourg Verlag; XP000125657, Published in: DE.

* cited by examiner

METHOD AND APPARATUS FOR CONFIGURING NETWORK NODES

The present invention can be used particularly for industrial networks such as Profinet RT (real time) and Profinet IRT (isochronous real time), but essentially also for any other (e.g. Profibus or Interbus), preferably Ethernet-based communications and data transmission networks particularly in the field of (process) automation engineering (industrial Ethernet) and relates to a method and an apparatus for configuring network nodes as part of the planning and setting up of an in particular real-time-based or real-time-linked and, where necessary, synchronous or clock-synchronous (isochronous) and preferably cyclical communication or data transmission between the network nodes.

Above all, real-time and real-time-linked, and in particular clock-synchronous (isochronous) communications and data transmission networks, such as Profinet RT or Profinet IRT for example, that is to say networks which guarantee real-time-based or real-time-linked and, where necessary, synchronous or clock-synchronous and therefore deterministic and, where necessary, equidistant communication or data transmission between at least two of their nodes, require planning or project engineering in advance as part of their setting up. This relates at least to the logical configuration (for example with regard to the sequence of the data to be transmitted both with Profinet RT and with Profinet IRT) and, where necessary, also to the physical configuration (for example with regard to the data transmission paths with Profinet IRT for optimizing the data transmission depending on the network topology).

Clock-synchronous or isochronous communication or data transmission, such as is possible with Profinet IRT for example, is necessary particularly for motion control in drive technology, that is to say for a motor controller for example, or with positioning operations.

Within the scope of this application, communications and data transmission networks, that is to say networks which enable an exchange of data and therefore communication between the nodes connected by them or via them, are also referred to just as networks for simplicity. Examples of the nodes mentioned are computers, programmable logic controllers and other machines or devices, in particular from the field of (process) automation engineering such as sensors or actuators, which communicate with one another or exchange data with one another and in particular process data by means of the network.

The logical configuration here in particular comprises the so-called I/O association, the definition of the I/O data to be transmitted and received, and the I/O configuration.

With regard to the process or I/O data connection of devices, the association of variables of a control program with the respective process or I/O data objects and network interfaces (ports and, where necessary, sub-ports) of devices is referred to as I/O association or also mapping. However, these devices initially only exist as a particular data record in a list, the so-called device list, or are recorded therein, wherein the recorded devices are potential network nodes which can preferably be controlled or are controlled by a control unit, in particular a programmable logic controller (PLC), which is likewise a network node and which executes the control program, in particular for operating an automation process.

In doing so, the device list preferably includes the data records of all possible devices of the different variants of a system or machine which can be controlled by means of the control program. A device data record contains a number of items of information which describe the particular device, such as, for example, a device name, a product designation, a functional description, the number and in each case unique designation or numbering of the available network interfaces and/or the definition of the process or I/O data objects made available by the device or to be made available to the device.

The control program is preferably put together in a modular fashion and, for each possible device or each nature of device and each type of device of the system or the device list, preferably includes corresponding program sections for the control thereof, wherein any particular program section can include one or more function blocks. The program sections which are necessary for the control of the devices or nodes which are actually present in the system and therefore connected to the network and linked to the control unit are executed when the control program is executed by the control unit.

The definition of the composition of the process or I/O data in a data telegram, particularly with regard to their structure, quantity and sequence, is referred to as the I/O configuration.

The physical configuration includes the definition of a network topology, that is to say the network nodes and the connections between them and their network interfaces.

Further, for example for a Profinet IRT network, IRT communications parameters, which for example define transmission and receiving times, that is to say times at which a data telegram is to be transmitted from one node to another, are additionally calculated for the network by means of an IRT planning algorithm based on at least some such information obtained from the logical and physical configuration.

For the purpose of planning or project engineering of the logical and physical configuration of a real-time and, where necessary, isochronous network as part of the planning and setting-up of the network for the purpose of commissioning said network, for example after a new structuring or restructuring of a (process) automation system, it is known, for a Profinet IRT network for example, that a person entrusted with the project engineering of such networks or systems uses a so-called engineering system which, as a rule, is formed by an engineering tool which runs on a data processing device, in the context of which an IRT planning algorithm also runs for the purpose of calculating IRT communications parameters for the IRT network. At the end of this planning step, the IRT communications parameters are calculated by means of the IRT planning algorithm. The following information in particular is then transmitted to the control unit by the engineering system, which is at least temporarily connected to the network for this purpose: a control or controller program, a device list, an I/O association, an I/O configuration, a desired topology as an input requirement for the setting-up of the network with its nodes and the connections as well as the further IRT communications parameters. In general, such engineering systems are known and available for a multiplicity of network types, for example for Profibus, Interbus and other, in particular Ethernet-based, buses as well as Profinet, Profinet RT and Profinet IRT.

From this information, in particular from the desired topology and the IRT communications parameters, which is now available in the control unit, the parts relevant to each node of the network are then transmitted thereto. The network nodes then automatically check whether their directly neighboring nodes correspond to the planned nodes and network interfaces in accordance with the desired topology. When each node has detected the appropriate correspondence, the desired topology can be activated as the actual topology and the network with its nodes or the system with its devices can be put into operation. If, however, when checking its neighbors, a node should detect deviations of the actual state from the desired topology, it transmits a diagnostic alarm to the control unit which prevents the network being put into operation until the cause has been rectified.

This known solution is shown schematically in FIG. 1, wherein the physical configuration is represented by the desired topology and the logical configuration by the I/O assignment, the latter being shown by means of the arrows between the device list and the control program.

A disadvantage of this solution according to the prior art shown schematically in FIG. 1 is that, although the control program is designed in such a way that the individual devices, that is to say system or machine parts and functions, are mapped by appropriate program modules so that a plurality of variants of a system or machine can be controlled by the control program, for every change of the actual topology or the actual state of the network, for example as a result of restructuring the system, removing and/or adding devices, the desired topology in particular must be correspondingly modified by means of the engineering system and retransmitted to the control unit together with the newly calculated IRT communications parameters based thereon, from where particularly the nodes concerned and their neighboring nodes receive the corresponding parts of the new information, in particular the desired topology and IRT parameters, before the network or system can be put back into operation in the modified state.

According to a further known solution for the project engineering or planning of a real-time and, where necessary, also isochronous network, it is provided that a plurality of alternative configurations is held available in the control unit and, in particular, the respective desired topologies and where necessary the associated IRT parameters corresponding to the possible variants of the system or machine, which then, without an engineering system being necessary once more for this purpose, only need to be selected, for example by means of a human-machine interface associated with the control unit, in particular a simple display and operating unit connected to the control unit, according to the respective actual topology or the respective actual state of the network for a certain variant of the system.

A problem of this solution, however, is that for machines with a large number of variants, such as in modular mechanical engineering for example, where the number of machine variants is almost unlimited, it is no longer practical to hold the required configuration, including the desired topology and the IRT communications parameters, available in the control unit for every possible variant.

A further known solution according to German patent application DE 102006042949.4 is based on the actual topology of the network and to a certain extent dispenses with a desired topology. Here, a so-called topology server in a communications network with further main nodes is programmed in such a way that it checks whether an event has occurred internally to the network and, if the internal event has occurred, automatically determines the current actual topology, automatically determines topology-dependent communications data based on communications relationships associated with the main nodes, and automatically transmits to each main node the part of the topology-dependent communications data which is relevant thereto.

It is true that this solution provides greater flexibility compared with the procedure previously described. However, the safety risk which results from dispensing with a desired topology which is independent of the actual topology or the actual state of the network is of disadvantage here. For without the possibility of a comparison of the desired and actual values, errors, such as wiring mistakes or the absence of a least one device which would have been provided according to a particular variant of the machine or system for example, cannot be reliably detected. Furthermore, although, according to this solution, it is provided that an operator can initiate the automatic configuration process externally, no other possible way of influencing the configuration is provided.

Another problem results from the fact that, although solutions, which, at least from the point of view of their approach, enable a dynamic adaptation of the physical configuration to changed network topologies, are known, essentially they do not allow a dynamic adaptation of the logical configuration to changes with regard to the I/O assignment and/or I/O configurations. Rather, I/O assignments and/or I/O configurations have always been already rigidly defined by means of an engineering system and, as a rule, require the assistance of the engineering system once more in order to adapt them. This is extremely impractical when, for example, a device in a system or machine is to be replaced due to a defect, for example, and although the new device provides the same functions as the old device, it requires a different process or I/O data connection and/or a different composition of the process or I/O data in a data telegram, for example, because it is of another type and/or originates from a different manufacturer from the old device.

However, as a rule, only appropriately specialized personnel are proficient in the use of an engineering system and this can therefore demand too much of the normal commissioning engineer or system user.

An object on which the present invention is based therefore consists in providing an alternative and, above all, flexible and safe option for configuring network nodes as part of the planning and setting-up of data transmission between the network nodes, which therefore removes at least one of the disadvantages of the prior art mentioned above in this regard.

In particular, this option is to be suitable for networks with real-time and, where necessary, synchronous or isochronous data transmission between the nodes.

In particular, the use of an engineering system is to be extensively superfluous.

In particular, it is still to be possible to carry out a comparison of the desired and actual values, especially with regard to the network topology.

In particular, however, the preparation and holding available of a multiplicity of desired topologies is to be avoided.

In particular, a logical configuration and/or physical configuration of the communication and of the network is to be possible.

In particular, this option is to be suitable for systems or machines with a large number of variants.

According to one of the independent claims, as a solution, the present invention provides a method for configuring at least one node of a network with regard to the exchange of data via the network in accordance with a desired state, according to which at least the at least one node is connected via the network to an apparatus which is programmed in such a way that, in response to at least one item of configuration-related information specified by an operator, it generates a set of configuration data which are necessary for configuring at least the at least one node and transmits at least a subset of this generated set of configuration data to the at least one node via the network.

According to another of the independent claims, as a solution, the present invention provides an apparatus which is suitable for carrying out the method described above and which has means for data processing and for executing program code and means for exchanging data with at least one further node to which the apparatus, which itself constitutes the first node so to speak, can be connected via a network, wherein the apparatus is programmed to configure the at least one further node with regard to the exchange of data via the network in accordance with a desired state. In response to at least one item of configuration-related information specified by an operator, the apparatus generates a set of configuration data which are necessary for configuring at least the at least one further node and transmits at least a subset of this generated set of configuration data to the at least one further node via the network.

An engineering system or a comparable system is essentially only required once for programming the apparatus. Thereafter, a node which is connected to the network and thereby to the apparatus can be configured with regard to the exchange of data via the network in accordance with a desired state without the assistance of an engineering system once more, wherein the operator is included in the configuration process due to the need to specify at least one item of configuration-related information. On the one hand, it is therefore possible for the operator to influence the otherwise automatically proceeding configuration process and, on the other, the result, as described in more detail in conjunction with the description of the figures, is an increased safety compared with the solution such as that proposed in DE 102006042949.4 for example. Furthermore, it is of advantage that the operator does not have to be trained to use a usually very complex engineering system in order to be able to configure a node with regard to the exchange of data via the network.

Expediently, the at least one item of configuration-related information can be specified by the operator by means of a human-machine interface preferably associated with the apparatus, in particular by means of an operating unit with input and output means which is connected to the apparatus.

Preferably, the apparatus is programmed to configure at least the at least one further node with regard to logical and/or physical aspects of the data exchange via the network.

As already mentioned in the introduction, examples of logical aspects are the I/O data to be transmitted and received, the I/O assignment and the I/O configuration. As likewise already mentioned, physical aspects relate particularly to the topology of the network.

Advantageously, on the one hand, the apparatus and the method can therefore be used or applied for the configuration of nodes in networks, such as Profinet RT, which only require logical configuration, as well as nodes in networks, such as Profinet IRT, which also require physical configuration.

As explained in more detail in conjunction with the description of the figures, the logical configuration without the assistance of an engineering system made possible by the present invention is particularly of advantage when, for example, a device of a system or machine is to be replaced and, although the new device provides the same functions as the old device, it requires a different process or I/O data connection and/or a different composition of the process or I/O data in a data telegram, for example, because it is of another type and/or originates from a different manufacturer from the old device.

It should be mentioned at this point, however, that the apparatus and the method can also be designed in such a way that only the logical or only the physical configuration is carried out by means of the apparatus, while the respective other configuration, if the particular network should require it, is still carried out by means of an engineering system.

Particularly preferably, the set of configuration data generated and required for configuring at least the at least one further node with regard to physical aspects includes a desired topology for the network.

Here, the desired topology is generated by the apparatus with regard to the set of configuration-related information specified by the user for the particular variant of a modular system or machine, for example. On the one hand, it is therefore not necessary to hold available a plurality of desired topologies for a plurality of possible variants, from which the appropriate one would then be selected in each case. On the other hand, however, an actual desired topology is still provided as a desired input requirement which enables an actual comparison of the desired and actual values and therefore, in particular, the detection of errors such as wiring mistakes or the absence of a least one device which would have been provided according to a particular variant of the machine or system, and therefore guarantees the safety.

Depending on the type and specification of the network and its further nodes, the apparatus expediently includes data exchange means which are designed for a cyclic, real-time and/or clock-synchronous exchange of data via the network. At the same time, the apparatus, which preferably includes means for real-time data exchange, is particularly preferably programmed to configure the at least one further node with regard to a real-time exchange of data via the network. Alternatively or in addition, the apparatus, which preferably includes means for clock-synchronous data exchange, is particularly preferably programmed to configure the at least one further node with regard to a clock-synchronous exchange of data via the network.

Preferably, the apparatus includes data exchange means for an exchange of data via the network which are designed according to the Profinet, Profinet RT or Profinet IRT specification.

Particular preferably, the set of configuration data generated and required for configuring at least the at least one further node includes a set of IRT-specific parameters calculated by the apparatus. The apparatus is therefore advantageously designed to also calculate the IRT communications parameters required for configuring a Profinet IRT network for example, so that a plurality of IRT parameter sets for a plurality of possible variants of a modular system or machine, from which the appropriate one would then be selected in each case, does not have to be held available, and nor does an engineering system have to be called upon in order to recalculate these parameters.

According to a particularly preferred embodiment, the apparatus reads a set of configuration-related information from the network and/or from the at least one further node, based on this generates the set of configuration data required for configuring at least the at least one further network node and, in response to at least one item of configuration-related information specified by the operator, in particular a release of the generated set of configuration data, transmits at least a subset of this generated set of configuration data to the at least one further node via the network.

According to a preferred embodiment, the apparatus initially checks the set of configuration data generated and required for configuring at least the at least one further node for plausibility per se before it transmits at least a subset of this generated set of configuration data to the at least one further node via the network.

According to a particularly preferred embodiment, the apparatus initially checks the set of configuration data generated and required for configuring at least the at least one further node for plausibility with regard to the actual state of the network and at least the at least one further node before it transmits at least a subset of this generated set of configuration data to the at least one further node via the network.

Preferably, the apparatus is programmed to configure itself by means of at least a subset of the generated set of configuration data with regard to the exchange of data via the network.

According to a particularly preferred embodiment, the apparatus is programmed in such a way that, after configuring, it controls the at least one further node, wherein the apparatus is in particular a programmable logic controller. According to the invention, it is therefore preferably provided that a programmable logic controller is programmed in such a way that it not only controls nodes of a network, which in particular are devices of a system or machine, but is also able to configure said nodes in advance of the operating phase with regard to the exchange of data via the network and therefore, along with the program code of a control program, also executes program code of a configuration program for this purpose.

Furthermore, according to another of the independent claims, the present invention provides a data processing and transmission system comprising an apparatus according to one of the embodiments described above and at least one further node which are connected to one another via a network and are able to exchange data with one another.

Furthermore, according to another of the independent claims, the present invention provides a data medium with a program code stored thereon, wherein the program code is designed in such a way that an apparatus according to one of the embodiments described above is formed when it is programmed with the program code.

This and further preferred embodiments and advantages of the present invention are explained below with reference to the attached drawings.

Of the attached drawings

FIGS. 2b and 2c show a schematic diagram of an example of the configuration of devices of a second expanded system variant (FIG. 2c) starting from a first basic variant of the system (FIG. 2b) using the embodiment of the invention according to FIG. 2a;

FIG. 1 shows a schematic diagram of a solution for configuring nodes of a network which is known from the prior art and is substantially as already described in the introduction.

Figure 1:
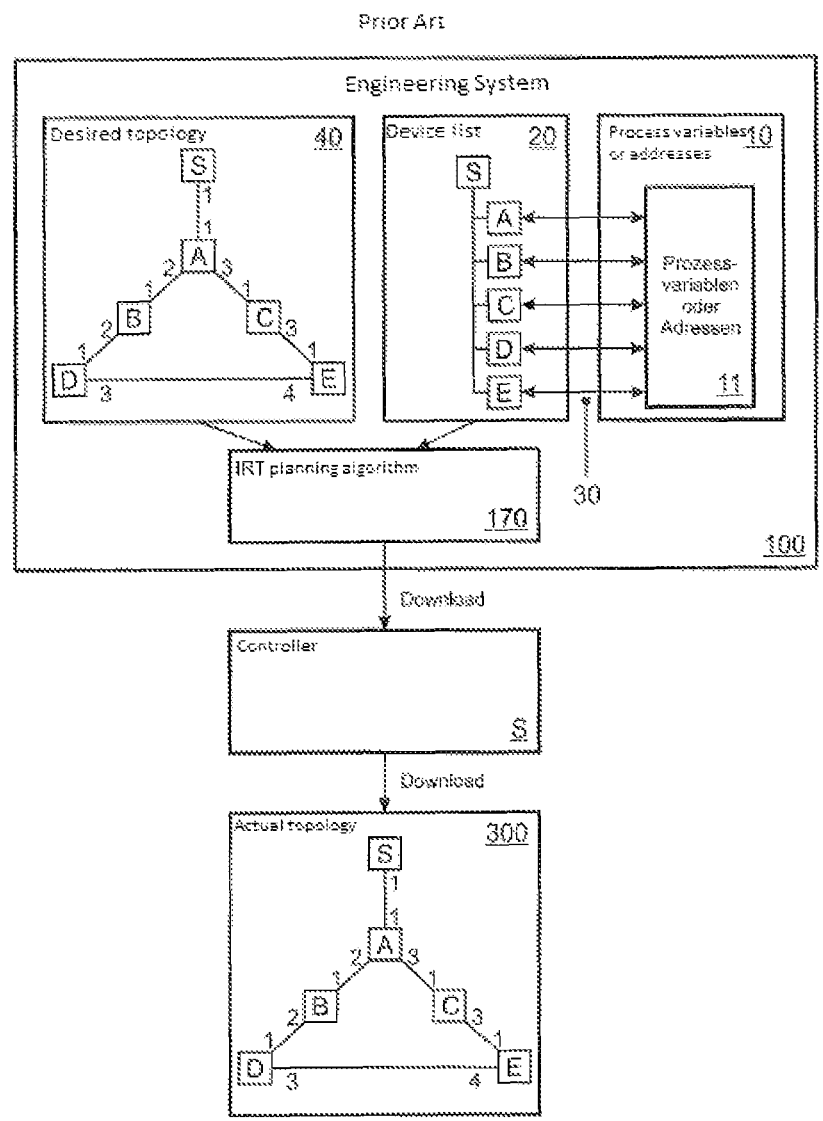
FIG. 1 shows a schematic diagram of a solution for configuring nodes of a network known from the prior art.

For the logical and physical configuration of the devices A, B, C, D and E and the controller S which belong to a particular variant of an industrial system, which is not shown in more detail in FIG. 1, and at the same time are nodes of a network by means of which they are connected in accordance with an actual topology 300 and are to be able to transmit and exchange data with one another, according to the solution reproduced in FIG. 1 and known from the prior art, an engineering system 100, which as a rule is formed by an engineering tool executed on a data processing device, usually a PC or a workstation, is always necessary.

The actual topology 300 is designed so that the controller S is initially connected by means of its network interface 1 to the network interface 1 of the device A. As well as the network interface 1, the device A also has two further network interfaces, hereinafter also referred to as ports, wherein it is connected by means of the port 2 to the port 1 of the device B and by means of the port 3 to the port 1 of the device C. The device B is connected by means of its further port 2 to the port 1 of the device D, and the device C has a connection by means of its further port 3 to the port 1 of the device E. There is also a connection between the port 3 of the device D and the port 4 of the device E.

The engineering system 100 is used for several subtasks as part of the planning and project engineering of a system having at least one controller S and a number of devices A to E, which, as nodes of a network, are in communication for the purpose of exchanging data. In general, such engineering systems are known and available for a multiplicity of different network types.

On the one hand, it is used for the development of a control or controller program 10, with which a control unit such as the controller S can be programmed to control devices such as the devices A to E, which in particular are sensors or actuators, while the system is operating. For this purpose, the controller program 10 includes appropriate program code for at least each of the devices A to E. On the other hand, a node list or device list 20, which in particular contains data records for the controller S and the devices A to E, is produced by means of the engineering system 100, wherein each device data record includes a set of information which describes the particular device in detail. It should be noted that, even though the device list in FIG. 1 is shown hierarchically in such a way that the devices A to E are subordinate to the controller S, this at least must not be taken to be the topology.

Furthermore, when incorporating the device list 20 and the controller program 10, the logical and physical configuration of the network nodes S and A to E is carried out by means of the engineering system 100 with regard to an exchange of data via the network, which, in this case, is implemented as Profinet IRT, so that the communication between the network nodes is carried out or is to be carried out cyclically, in real time and clock-synchronously.

Here, the logical configuration includes the I/O association 30, for example, which is shown in FIG. 1 by means of the arrows between device data records contained in the device list 20 and the controller program 10. In the I/O association, which is also referred to as mapping, individual process variables or addresses 11 of the controller program 10 are associated with the process or I/O data objects at least of the devices A to E defined in the respective device data records of the device list 20. As a rule, the logical configuration also includes the I/O configuration, which is not shown in FIG. 1 and which relates to the definition or composition of the process or I/O data of the individual nodes in a data telegram, in particular with regard to their structure, set and sequence.

In FIG. 1, the physical configuration is represented by the desired topology 40, by means of which the communications connections between the network nodes, that is to say the devices A to E and the controller S, can be project engineered. The information and designations relating to individual devices A to E and the controller S and, above all, their network interfaces, contained in the device data records of the device list 20 are called upon for this purpose.

It must once again been mentioned that, as a basic principle, the planning of the logical configuration can be carried out substantially independently of the physical configuration, in particular independently of the topology. Furthermore, the planning of the physical configuration, that is to say in particular the desired topology, can be carried out substantially independently of the logical configuration as long as at least one device list, which at least contains the designations of the individual nodes and their individual ports, is available.

In addition, the engineering system 100 according to FIG. 1 also includes an IRT planning algorithm 170 for calculating IRT communications parameters for the Profinet IRT-based network which, for example, define transmission and receiving times, that is to say times at which a data telegram is to be transmitted from one node to another, in particular based on information from the desired topology 40 and the node or device list 20 and the I/O configuration.

After planning the logical and physical configuration by means of the engineering system 100, the whole of the configuration data including the device list 20 and the controller program 10 are transmitted to the controller S (designated as download in the figure), to which the engineering system 100 is at least temporarily connected.

From these configuration data which are now present in the control unit S, the relevant parts for each node of the network, that is to say the devices A to E, are transmitted thereto (designated as download in the figure). The network nodes then automatically check whether their directly adjacent nodes correspond to the planned nodes and network interfaces in accordance with the desired topology.

When each node has detected the appropriate correspondence, the project-engineered nodes with their devices and the network with its nodes can be activated and put into operation. If, however, when checking its neighbors, a node should detect deviations between the actual and the desired state, it transmits a diagnostic alarm to the controller S, which thereupon prevents the system and the network being put into operation until the causal fault has been rectified.

According to the solution known from the prior art and shown in FIG. 1, it is necessary to proceed in this way whenever changes to the actual topology with regard to the nodes occur due to a redesign of the design of the system in accordance with another variant for example, whether at least one node is added or removed or the nodes are connected to one another in a different manner.

The disadvantage of this known solution is obvious and has already been explained in the introduction.

For better understanding, in the following description of embodiments according to the invention based on FIGS. 2a, 2b and 2c and 3a, 3b and 3c, the references introduced within the scope of the preceding description of an already known solution according to FIG. 1 are retained as far as comparable features are concerned.

Figure 2A:
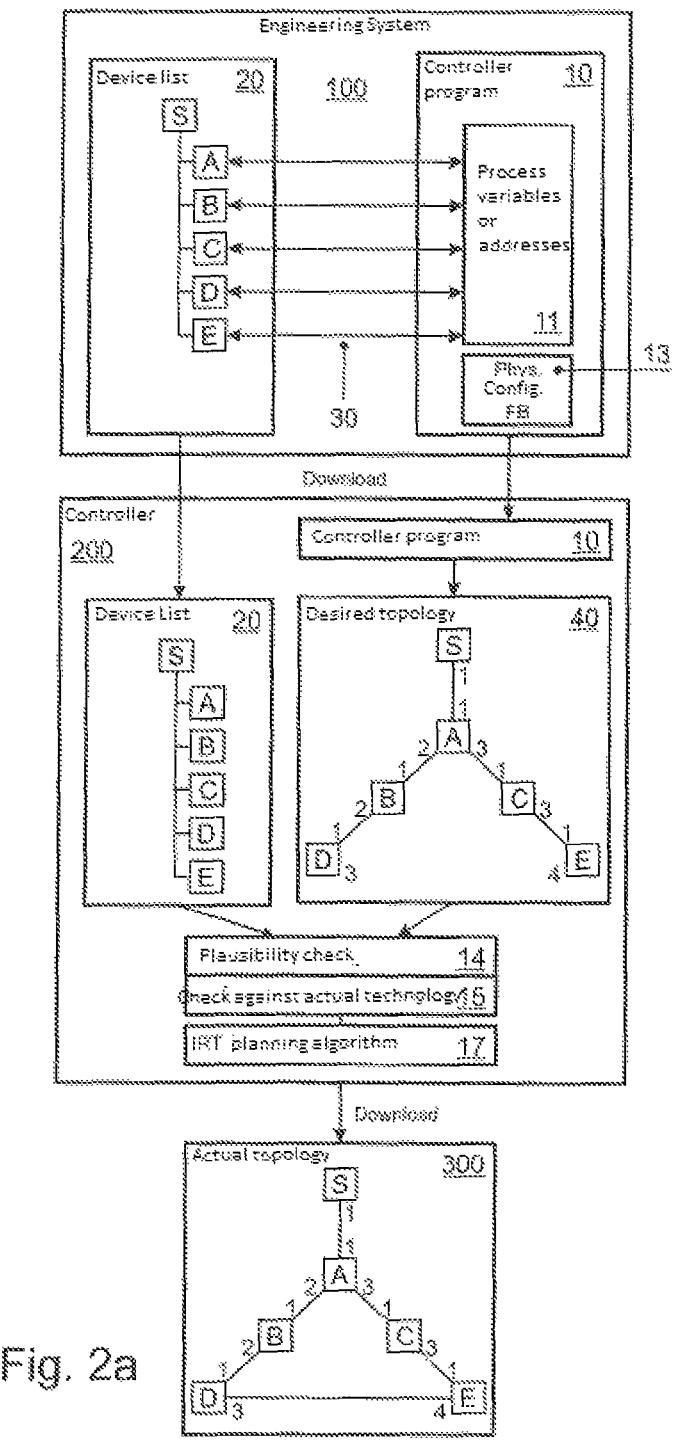
FIG. 2a shows a schematic diagram of an embodiment according to the invention for configuring nodes of a network.

FIG. 2a shows a schematic diagram of an embodiment according to the invention for configuring nodes of a network.

The network nodes to be configured are the devices A, B, C, D and E and the controller S which belong to a particular variant of an industrial system, which is not shown in more detail in FIG. 2a, and are connected by means of a network in accordance with an actual topology 300, via which data are to be able to be transmitted and exchanged with one another. The actual topology 300 is designed so that the controller S is initially connected by means of its network interface 1 to the network interface 1 of the device A. As well as the network interface 1, the device A also has two further network interfaces, hereinafter also referred to as ports, wherein it is connected by means of the port 2 to the port 1 of the device B and by means of the port 3 to the port 1 of the device C. The device B is connected by means of its further port 2 to the port 1 of the device D, and the device C has a connection by means of its further port 3 to the port 1 of the device E. There is also a connection between the port 3 of the device D and the port 4 of the device E. As well as the network interfaces or ports shown in FIG. 2a, the controller S and the devices A to E can also have further interfaces or ports which, however, are not shown in the figure, as they have no network connection according to the actual topology 300.

As part of the planning and project engineering of a system expediently having at least one controller and a number of devices, which, as nodes of a network, are in communication for the purpose of exchanging data, according to the invention, an engineering system 100 is also used for several subtasks. However, the differences compared with the prior art, as shown particularly with reference to FIG. 1, and the resulting advantages will become clear from the following detailed description of an embodiment according to the invention.

On the one hand, the engineering system 100 is used for the development of a control or controller program 10, with which a control unit such as the controller S can be programmed to control devices such as the devices A to E, which in particular are sensors or actuators, while the system is operating. For this purpose, the controller program 10 includes appropriate program code for at least each of the devices A to E, and in particular, at this stage, for further devices which would be used with variants of the system other than that according to FIG. 2a. On the other hand, a node list or device list 20, which in particular contains data records for the controller S and the devices A to E, and preferably also, at this stage, for further devices which would be used with other variants of the system, is produced by means of the engineering system 100, wherein each device data record includes a set of information which describes the particular device in detail, and in particular a unique device name or such a designation which allows a unique identification of the particular device, information relating to the nature, type and manufacturer of the device, a functional description, a definition of the process data of the device, a unique designation of each network interface of the device and the respective network interface type, for example with regard to the necessary transmission medium (copper or glass fiber for example). Once again, however, the device list in this example does not represent a topology.

Furthermore, when incorporating the device list 20 and the controller program 10, the logical configuration in particular of the network nodes S and A to E is carried out by means of the engineering system 100 with regard to an exchange of data via the network which, in this case, is again implemented as Profinet IRT, so that the communication between the network nodes is carried out or is to be carried out cyclically, in real time and clock-synchronously. Here, the logical configuration includes the I/O association 30, for example, which is shown in FIG. 2a by means of the arrows between device data records contained in the device list 20 and the controller program 10, and the I/O configuration which is not shown in FIG. 2a.

In contrast, with the embodiment according to the invention shown in FIG. 2a, the physical configuration is no longer carried out by means of the engineering system 100. Instead, according to the invention, a configuration program is developed or created, preferably by means of the engineering system 100, which includes program code with which an apparatus 200 can be programmed to configure nodes such as the devices A to E with regard to the exchange of data via the network, and, in response to at least one item of configuration-related information specified by an operator, to generate a set of necessary configuration data for this purpose and to transmit at least a subset of the generated configuration data via the network to a node to be configured, wherein the set of configuration data generated by the apparatus 200 expediently includes a desired topology for configuration with regard to physical aspects.

As can be seen from FIG. 2a, the apparatus 200 in this example is a controller, so that in this case the apparatus 200 is simultaneously also the controller S. For this reason, as well as a set of program code with appropriate process variables and/or addresses 11 for the control of devices, the controller program 10 created by means of the engineering system 100 also includes an additional program section 13 which contains program code, preferably incorporating at least one function block, for the physical configuration of devices or network nodes. Function blocks of this kind or similar or other mechanisms can also be incorporated in a stand-alone configuration program, particularly when the apparatus 200 is implemented separately from the controller S, which according to the invention can likewise be provided on an application-specific basis.

Function blocks for adding and connecting nodes based on their respective unique device and port designation for generating a desired topology appear, for example, as follows:

```
FB_AddDevice(IN: DeviceID)
FB_AddConnecton(IN: DeviceID, PortID, PartnerDeviceID,
    PartnerPortID) return
    ErrorCode
```

According to the invention, with this embodiment, the configuration data including the device list 20 and the controller program 10 together with the program section 13 can be transmitted at this stage to the apparatus 200, which in this case is simultaneously also the controller S, (designated as download in the figure), wherein the engineering system 100 is at least temporarily connected to the apparatus 200.

According to the invention, it is therefore preferably provided that a programmable logic controller is programmed in such a way that it not only controls nodes of a network, which in particular are devices of a system or machine, but is also able to configure said nodes in advance of the operating phase with regard to the exchange of data via the network and therefore, as well as the program code of a control program, also executes program code of a configuration program for this purpose.

When executing the controller program, the program section 13 and therefore the program code for configuring the network nodes is preferably executed first. By means of an operating unit, which is not shown in the figure, an operator is now able to specify configuration-related information in a simple way and, with a view to the desired network topology, in particular which device is connected to another by means of which port. In doing so, the operator can call upon the information from the data records of the device list 20 and therefore preferably only needs to select the appropriate devices and network interfaces.

In response to this information, the apparatus 200 or the controller S generates further configuration data with regard to the physical aspects of the exchange of data between the nodes and in particular a desired topology 40 in addition to the configuration data with regard to logical aspects of the exchange of data between the nodes which have already been transmitted to it by the engineering system 100. Expediently, the information from the data records of the device list 20 with regard to the individual devices A to E and the controller S and, in particular, their network interfaces is called upon for this purpose.

At run time, a program section for linking the node S and A to E, for example, for generating the desired topology 40, wherein the above-mentioned function blocks are used the appropriate number of times, appears as follows:

```
/* Addition of the nodes S and A to E to the desired topology */
FB_AddDevice("S");
FB_AddDevice("A");
FB_AddDevice("B");
FB_AddDevice("C");
FB_AddDevice("D");
FB_AddDevice("E");
/* Connection of node S to node A */
ErrorCode = FB_AddConnection("S", "1", "A", "1");
If ErrorCode != OK /* Response in the event of an error */;
/* Connection of node A to node B */
ErrorCode = FB_AddConnection("A", "2", "B", "1");
If ErrorCode != OK /* Response in the event of an error */;
/* Connection of node A to node C */
ErrorCode = FB_AddConnection("A", "3", "C", "1");
If ErrorCode != OK /* Response in the event of an error */;
/* Connection of node B to node D */
ErrorCode = FB_AddConnection("B", "2", "D", "1");
If ErrorCode != OK /* Response in the event of an error */;
/* Connection of node C to node E */
ErrorCode = FB_AddConnection("C", "3", "E", "1");
If ErrorCode != OK /* Response in the event of an error */;
/* Connection of node D to node E */
ErrorCode = FB_AddConnection("D", "3", "E", "4");
If ErrorCode != OK /* Response in the event of an error */;
```

In the event of an error, appropriate diagnostic information, which can be output by means of a human-machine interface, for example, such as an operating unit (not shown) connected to the apparatus 200, would be available.

Expediently, the apparatus 200 is programmed with further additional program code 14 in such a way as to check the generated desired topology 40 for plausibility per se. In doing so, a check is particularly carried out as to whether the ports of the devices to be connected are present and are of the same type, at least in accordance with the device description which can be taken from the device list 20, and whether the topology is likewise consistent in other respects. In the event of an error, appropriate diagnostic information, which can be output by means of a human-machine interface, for example, would be available. A program code 14 of this kind could possibly appear as follows:

```
/* Desired topology check */
ErrorCode = ValidateTopology( );
If ErrorCode != OK /* Response in the event of an error */;
```

Preferably, the apparatus 200 is programmed with further additional program code 15 in such a way as to check the generated desired topology with regard to the present actual topology 300, in particular as to whether the devices to be connected according to the desired topology 40 are present at all in the actual topology 300 and whether the nature of device and type of device according to desired and actual correspond. Preferably, a check is also carried out as to whether the unique device designations as provided according to the device list 20 and desired topology 40 correspond to those of the devices A to E in the actual topology 300. In the event of an error, appropriate diagnostic information, which can be output by means of a human-machine interface, for example, would be available.

As, according to the actual topology 300, the network is implemented as Profinet IRT, the apparatus 200 is expediently programmed with further additional program code 17 in such a way that it provides the functionality of an IRT planning algorithm for calculating IRT communications parameters, in particular with regard to the magnitude of the time slots to be reserved accordingly for the data transmission, based on the device list 20 and the I/O configuration (not shown in FIG. 2*a*) and the generated desired topology 40.

Program code 17 of this kind could possibly appear, for example, as follows:

```
/* Start IRT planning algorithm */
CalculateCommunicationParameters( );
```

The program code 14, 15 and 17 is shown in FIG. 2*a* as a stand-alone configuration program in each case; alternatively, however, it could also be three program sections of a single configuration program or of the control program 10, for example; this also depends in particular on whether the apparatus 200 is a controller or an apparatus which is separate from the controller.

Finally, the planned and generated or calculated configuration data are then transmitted by the apparatus 200 or the controller S to the further nodes of the network in accordance with the actual topology 300, that is to say to the devices A to E (designated as download in the figure), wherein each node receives the subset of configuration data which is relevant thereto. This takes place, for example, as a result of the following program code:

```
/* Start up network and load generated configuration (project engineering)
to devices */
Activate Configuration( );
```

On receipt of the configuration data, the nodes then automatically check whether their directly adjacent nodes in accordance with the actual topology 300 correspond to the planned nodes and network interfaces in accordance with the desired topology.

Alternatively or in addition, when specifying the at least one configuration-related item of information, according to the invention, the operator is able to enable a network topology, which is automatically determined at least in part by the apparatus 200 and preferably displayed on the operating unit as a so-called online visualization of the system, as the desired topology. In this case, the apparatus 200 is programmed accordingly to generate a desired topology based on connection information read out from the network and from the connected nodes in accordance with the actual topology, wherein the read-out connection information preferably includes unambiguous designations of the devices and their interfaces.

As, according to the invention, an operator is included in the configuration process in such a way that he must at least specify configuration-related information, whether it be in such a form that, with a view to the desired network topology, he simply specifies which device is connected to another via which port or that he enables a network topology automatically determined by the apparatus 200 as the desired topology before the set of configuration data generated by the apparatus 200 is transmitted and activated, the security offered by an actual comparison of the desired and actual values is still guaranteed without the renewed use of an engineering system being necessary for every change to a system, wherein basically any desired topologies can be generated by the apparatus 200.

Figure 2B:
Figure 2C:
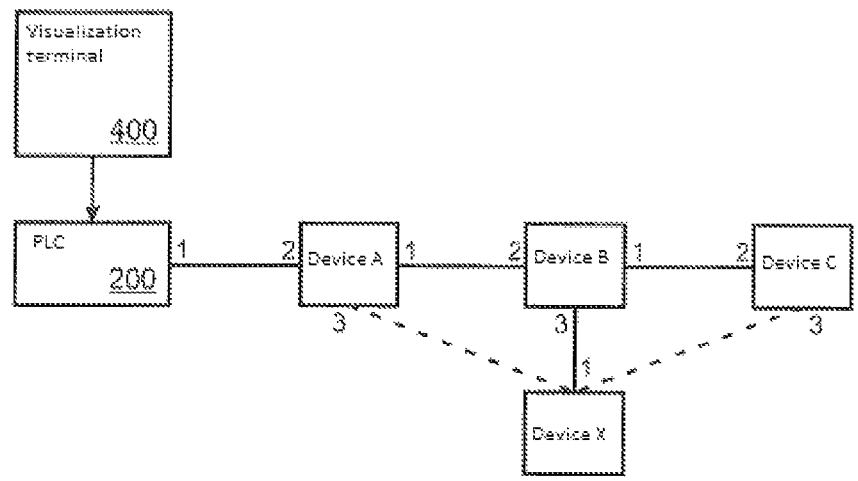

FIGS. 2*b* and 2*c* show an example of the configuration of devices of a second expanded system variant (FIG. 2*c*) starting from a first basic variant of the system (FIG. 2*b*) using the embodiment of the invention according to FIG. 2*a*.

According to its basic variant, as shown in FIG. 2*b*, as well as a controller 200, a system also includes the devices A, B and C which are connected to one another and are therefore nodes of a common communications network. The small numbers next to the nodes represent the unique designation of their respective network interfaces.

As well as this basic variant, there are further variants, according to which the system can include further devices, for example, as optional additional components which are likewise to be incorporated into the network as nodes, thus enabling data to be exchanged at least with the controller 200 for the control of said nodes. For example, there is a variant with which the system also includes a device for feeding in material, which can potentially be connected to different points in the network.

When building up the system, the individual devices are assembled according to the customer's order and the conditions on site. In doing so, as in the example shown in FIG. 2*c*, the device for feeding in material (device X) is also added and connected by means of its port 1 to the port 3 of device B. This can be seen from the continuous line between the devices X and B, while the other possible connections are indicated by the dotted lines between the device X and the devices A and C.

According to the embodiment described above and shown in FIG. 2*a*, the controller (PLC) 200 according to FIGS. 2*b* and 2*c* is programmed, on the one hand, to be able to control the devices of all possible variants of the system and, on the other, to also be able to generate the configuration data which are necessary for configuring the respective devices with regard to physical aspects of the data exchange between the devices and the controller.

Consequently, as well as the appropriate program code, a device list and the configuration data required for configuring the devices with regard to logical aspects of the data exchange and in particular I/O association and I/O configuration as already described above in conjunction with FIG. 2*a*, are also located in the controller 200 although this is not explicitly shown in FIGS. 2*b* and 2*c*.

In order to be also able to configure the devices of the system variant shown in FIG. 2*c* with regard to physical aspects of the data exchange, the controller 200 also requires the input of at least one item of configuration-related information by the operator. For this purpose, the latter can use the visualization terminal 400 connected to the controller 200 as an operating unit in order to specify that, in addition to the basic variant, the device X is now connected by means of its port 1 to the port 3 of the device B. In doing so, the operator can call upon the information from the data records of the device list and therefore preferably only needs to select the appropriate devices and network interfaces.

The corresponding program section for the subsequent processing of the configuration-related information specified by the operator and the generation of a corresponding desired topology at run time could, for example, appear as follows:

```
FB_AddDevice("PLC");
FB_AddDevice("A");
FB_AddDevice("B");
FB_AddDevice("C");
FB_AddDevice("X");
FB_AddConnection("PLC", "1", "A", "2");
FB_AddConnection("A", "1", "B", "2");
FB_AddConnection("B", "1", "C", "2");
FB_AddConnection("B", "3", "X", "1");
```

A plausibility check of the generated desired topology is also carried out in the controller 200. In addition, the desired topology is checked against the present actual topology. In the event of a fault, corresponding diagnostic information would be available in each case and can be output, for example, via the visualization terminal 400 connected to the controller 200.

The required IRT communications parameters, for example transmitting and receiving times of data telegrams, are also calculated.

Finally, the planned and generated or calculated configuration data are transmitted by the controller 200 to the further nodes of the network, that is to say to the devices A, B, C and X, wherein each node receives the subset of configuration data which is relevant thereto.

Operation of the system in the expanded variant according to FIG. 2c can then be activated.

Figure 3A:
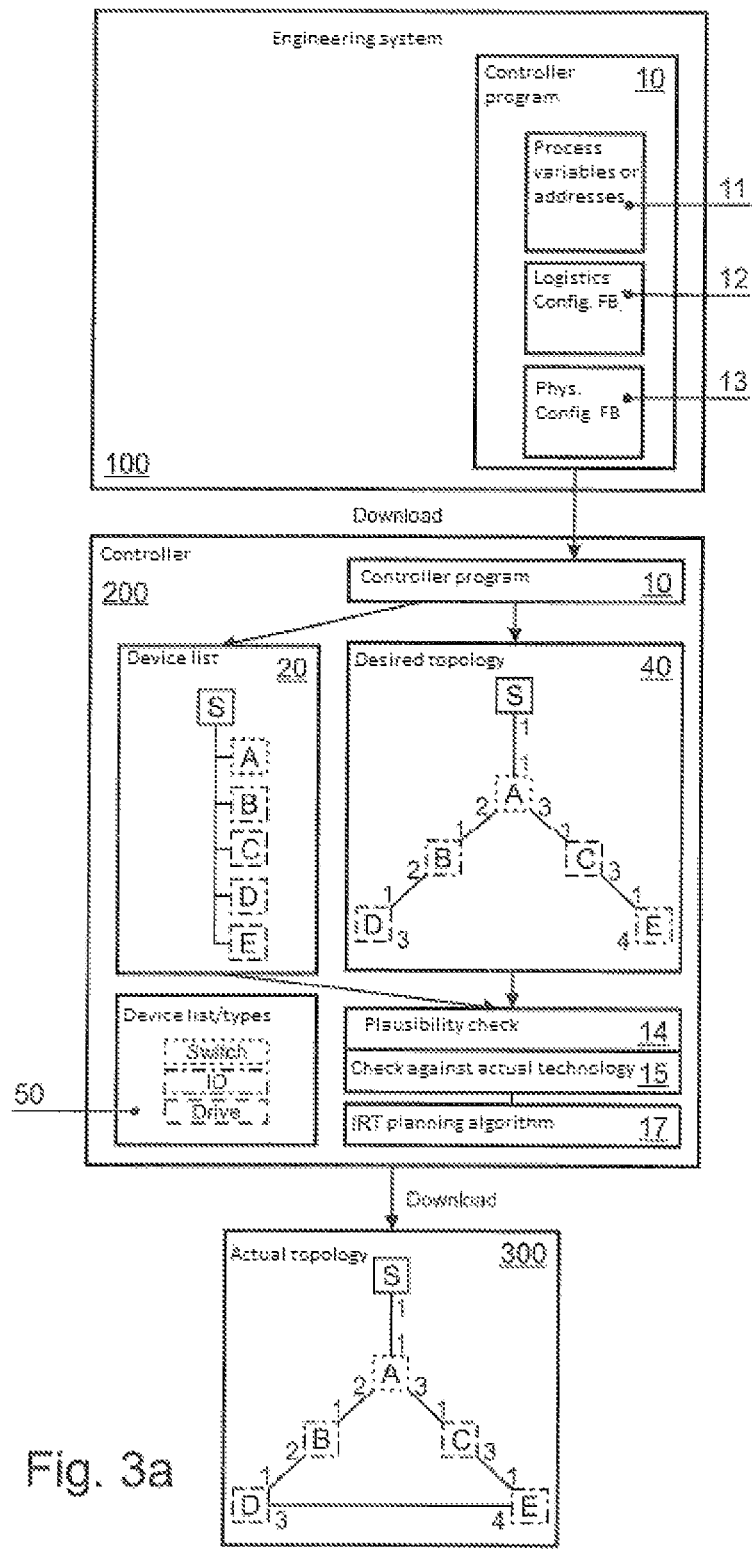
FIG. 3a shows a schematic diagram of a further embodiment according to the invention for configuring nodes of a network.

FIG. 3a is a schematic diagram of a further embodiment according to the invention for configuring nodes of a network which, in particular, are devices of an industrial automation system.

The network nodes to be configured are the devices A, B, C, D and E and the controller S which belong to a particular variant of an industrial system, which is not shown in more detail in FIG. 3a, and are connected by means of a network in accordance with an actual topology 300 which, in this case, is again implemented as Profinet IRT so that the communication between the network nodes is carried out or is to be carried out cyclically, in real time and clock-synchronously. The small numbers next to the nodes represent the unique designation of their respective network interfaces.

As part of the planning and project engineering of a system expediently having at least one controller and a number of devices, which, as nodes of a network, are in communication for the purpose of exchanging data, according to this embodiment, an engineering system 100 is essentially only used for developing or creating a control or controller program 10 with which a control unit, such as the controller S, can be programmed to control devices, such as the devices A to E, while the system is operating. For this purpose, the controller program 10 includes appropriate program code for at least each of the devices A to E, and in particular, at this stage, for further devices or types or natures of devices which would be used with variants of the system other than that according to FIG. 3a.

The differences compared with the embodiment previously described with reference to FIGS. 2a to 2c and the resulting additional advantages become clear from the following detailed description of this embodiment according to the invention.

According to this further embodiment according to the invention, in addition to the physical configuration, the logical configuration is also no longer carried out by means of the engineering system 100. Rather, instead, a configuration program is to be developed or created, preferably by means of the engineering system 100, which includes program code with which an apparatus 200 can be programmed to configure nodes such as the devices A to E with regard both to logical and physical aspects of the data exchange via the network, and, for this purpose, in response to at least one item of configuration-related information specified by an operator, to generate a set of necessary configuration data and to transmit at least a subset of the generated configuration data via the network to a node to be configured. At the same time, the apparatus 200 can generate both a device list 20 and, with regard to the configuration, appropriate configuration data relating to logical aspects which, in particular, define the I/O associations and I/O configuration.

As can be seen from FIG. 3a, the apparatus 200 is also a controller in this example, so that in this case the apparatus 200 is simultaneously also the controller S. For this reason, as well as a set of program code with appropriate process variables and/or addresses 11 for the control of devices, the controller program 10 created by means of the engineering system 100 also includes an additional program section 13 which contains program code, preferably incorporating at least one function block, for the physical configuration of devices or network nodes and a further additional program section 12 which contains program code, preferably incorporating at least one function block, for the logical configuration of devices or network nodes. Function blocks of this kind or similar or other mechanisms can, however, also be incorporated in a stand-alone configuration program, particularly when the apparatus 200 is implemented separately from the controller S, which according to the invention can likewise be provided on an application-specific basis.

According to the invention, with this embodiment, the controller program 10 together with the program sections 12 and 13 can be transmitted at this stage to the apparatus 200, which in this case is simultaneously also the controller S, (designated as download in the figure), wherein the engineering system 100 is at least temporarily connected to the apparatus 200.

As can be seen from FIG. 3a, a device catalogue 50 (repository) with entries for device types, which are preferably classified by device nature such as switch, I/O or drive, is located in the apparatus 200, wherein a set of further description data, such as the manufacturer's name, for example, is provided for each device type. Such a device catalogue 50 can preferably likewise be created by means of an engineering system 100 and then transmitted to the apparatus 200.

A function block for adding a data record for a particular device to the device list using the description data which are stored for the device type of this device in the device catalogue could, for example, appeared as follows:

FB_CreateLogDevice(IN: DeviceID, DeviceNature, DeviceType, VendorID) return ErrorCode A function block for creating an I/O association between a variable 11 of the controller program 10 and a process data address of the device which is contained in the device list 20 could, for example, appear as follows:
FB_CreateIOConnection(IN: VariableName, DeviceID, Address)

When executing the controller program, the program section 12 and therefore the program code for the logical configuration of the network nodes is preferably executed first.

By means of an operating unit, which is not shown in the figure, an operator is now able to specify configuration-related information in a simple way and, with a view to the desired network topology, in particular which devices appear therein, in order to enable a device list 20 with appropriate device data records to be generated. In doing so, the operator can call upon the information from the entries in the device catalogue 50 and therefore preferably only needs to select the appropriate device types and specify unique device names.

In response to this information, the apparatus 200 or the controller S generates the corresponding device list 20. Expediently, the information contained in the device catalogue 50 with regard to the device types and further data of the individual devices A to E and the controller S and, in particular, their network interfaces are called upon for this purpose.

A program section for generating the device list 20 using the device catalogue 50 for adding a data record for the device "A" of device nature "switch", device type "Type 1" and manufacturer "H1" and a data record for the device "B" of device nature "I/O", device type "Type 11" and manufacturer "H2" would, for example, appear as follows at run time, wherein the above-mentioned function blocks are used the appropriate number of times:

```
/* Addition of devices to the device list */
FB_CreateLogDevice("A", "Switch", "Type 1", "H1");
FB_CreateLogDevice("B", "I/O", "Type 11", "H2");
```

The program code for the further devices C to E of the actual topology 300 would appear in a correspondingly similar manner.

By means of the operating unit not shown in the figure, the operator is again able to specify configuration-related information with regard to the I/O assignment.

A program section for generating appropriate links between a variable 11 of the controller program 10 and a process data address of the device which is now contained in the device list 20 could, for example, appear as follows at run time, wherein the above-mentioned function blocks are used the appropriate number of times:

```
/* I/O assignment */
FB_CreateIOConnection("Variable", "A", "Address 10.4");
FB_CreateIOConnection ("Variable 2", "B", "Address 6.4");
```

The program code for the further devices C to E of the actual topology 300 would appear in a correspondingly similar manner.

A program section for generating further configuration data in response to appropriate operator specifications, in particular with regard to the I/O configuration, for example regarding parameters such as update times or timeouts for individual devices, can likewise be provided.

If a suitable entry for a device is not contained in the device catalogue 50, it is also possible for all required data or parameters to be entered by the operator by means of the operating unit, wherein these could also be stored in the device catalogue 50 for later use or, alternatively, an expanded device catalogue 50 can be loaded into the apparatus 200.

Furthermore, if they cannot be found in the device catalogue 50, it is conceivable for particulars of a device to be read out of the respective device by the apparatus 200 if the device is already connected to the apparatus 200.

Preferably, the configuration relating to the physical aspects can be carried out after the configuration of the logical elements or aspects, wherein the program section 13 and therefore the program code for the physical configuration of the network nodes is executed for this purpose.

Resort can be made to the now available device list 20 when generating the physical configuration data, which substantially takes place as already described above for the first embodiment.

As can be further seen from FIG. 3a, the apparatus 200 is expediently also programmed with further program code 14 for checking the plausibility of the generated desired topology 40, with program code 15 for checking the desired topology 40 with regard to the present actual topology 300, and with program code 17 for calculating IRT communications parameters, wherein, in this regard, reference is likewise made to the above explanations relating to the first embodiment.

Finally, according to the embodiment shown in FIG. 3a, the planned and generated or calculated configuration data are also transmitted by the apparatus 200 or the controller S to the further nodes of the network in accordance with the actual topology 300, that is to say to the devices A to E (designated as download in the figure), wherein each node receives the subset of configuration data which is relevant thereto.

Preferably, the apparatus 200 is programmed with further additional program code, which is not shown in the figure, in such a way that it provides the functionality to assign device names and/or other device identification as provided according to the desired topology 40 and the device list 20, to devices A to E of the actual topology 300 (so-called device naming), so that a unique identification of the devices is ensured in later operation of the system and the network, wherein the devices of the actual topology "to be named" are in each case initially determined by the apparatus 200 or the controller S based on the neighboring devices connected thereto and, where necessary, based on the respective device nature and/or device type. In the event of a fault, that is to say, for example, if a device in the actual topology cannot be determined, appropriate diagnostic information is available which is then responded to accordingly.

Figure 3B:
FIGS. 3b and 3c show a schematic diagram of an example of the configuration of devices of a system using the embodiment of the invention according to FIG. 3a after a device of a first type (FIG. 3b) has been replaced by a device of a second type (FIG. 3c).
Figure 3C:
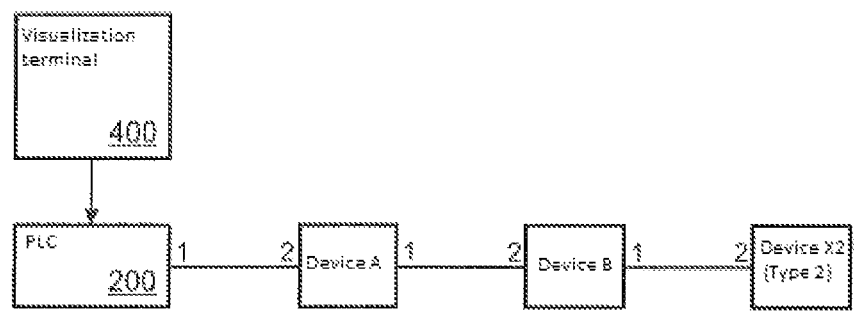

FIGS. 3b and 3c show an example of the configuration of the devices of a system using the embodiment of the invention according to FIG. 3a after a device of a first type (FIG. 3b) has been replaced by a device of a second type (FIG. 3c).

A machine or system can include a multiplicity of devices which are connected to one another. The example starts from the operation of a wind turbine in which, as well as a controller 200 (PLC) and the devices A and B, a frequency converter of Type 1, which in FIG. 3b is shown as device X1, is used, wherein the devices A, B, X1 and the controller 200 are connected to one another and are therefore nodes of a common communications network. The small numbers next to the nodes represent the unique designation of their respective network interface.

If a component fails, then it cannot always be replaced by a component of the same design. As machines and systems are often in use for many decades, it is impossible to know at the time the system was created which spare components might come to be used. Therefore, after a failure of the frequency converter of Type 1, this is to be replaced by a frequency converter of Type 2, as can be seen in FIG. 3c, which, although this basically fulfils the same function, has a different identification, in particular a different device name, device type and device manufacturer as well as possessing a different sequence of process data. However, according to the invention, this replacement component of a different type can be configured and integrated easily and safely.

According to the embodiment described above and shown in FIG. 3a, the controller (PLC) 200 according to FIGS. 3b and 3c is programmed, on the one hand, to be able to control the devices of all possible variants of the system and, on the other, to also be able to generate the configuration data which are necessary for configuring the respective devices with regard to both logical and physical aspects of the data exchange between the devices and the controller.

Consequently, as well as the appropriate program code, a device catalogue as already described above in conjunction with FIG. 3a, is also already located in the controller 200 although this is not explicitly shown in FIGS. 3b and 3c.

In order to be able to configure the devices of the system and in particular the device X2 shown in FIG. 3c with regard to logical aspects of the data exchange, the controller 200 requires the input of configuration-related information by the operator. For this purpose, the latter can use the visualization terminal 400 connected to the controller 200 as an operating unit in order to specify that the device X2 is now present in the system, wherein the operator can call upon the description data contained in the device catalogue for the device type of the device X2 and therefore preferably only needs to specify the unambiguous device name so that a device data record generated by the controller 200 for the device X2 can be added to the device list in response to this information.

The corresponding program section for generating and adding a device data record for the device "X2" of device nature "frequency converter" of device type "Type 2" and manufacturer "HS 23" with an update time of "1 ms" could, for example, appear as follows at run time:
FB_CreateLogDevice("X2", "frequency converter", "Type 2", "HS 23", "1 ms");

Furthermore, the operator can use the visualization terminal 400 connected to the controller 200 to specify information with regard to the I/O assignment, as the device X2 has a different connection of the process or I/O data.

A program section for generating appropriate links between a variable "DesiredSpeed" of the controller program 10 and a process data address of the device X2 which is now contained in the device list could, for example, appear as follows at run time:
FB_CreateIOConnection("DesiredSpeed", "X2", "Address 8.2");

In order to be also able to configure the devices of the system with regard to physical aspects of the data exchange, the controller 200 must also be told that, instead of the device X1, the device X2 is now connected by means of its port 2 to the port 1 of the device B. On the one hand, the visualization terminal 400 and, on the other, the information from the data records in the device list can be used for this purpose, so that the operator preferably only needs to select the appropriate devices and network interfaces.

The corresponding program section for the subsequent processing of the configuration-related information specified by the operator and the generation of a corresponding desired topology could, for example, appear as follows at run time:

```
FB_AddDevice("PLC");
FB_AddDevice("A");
FB_AddDevice("B");
FB_AddDevice("X2");
FB_AddConnection("PLC", "1", "A", "2");
FB_AddConnection("A", "1", "B", "2");
FB_AddConnection("B", "1", "X2", "2");
```

A plausibility check of the generated desired topology is also carried out in the controller 200. In addition, the desired topology is checked against the present actual topology. In the event of a fault, corresponding diagnostic information would be available in each case and can be output, for example, via the visualization terminal 400 connected to the controller 200.

The required IRT communications parameters, for example transmitting and receiving times of data telegrams, are also calculated by the controller 200.

Finally, the planned and generated or calculated configuration data are transmitted by the controller 200 to the further nodes of the network, that is to say to the devices A, B and X2, wherein each node receives the subset of configuration data which is relevant thereto.

Operation of the system with the devices according to FIG. 3c can then be activated.

Finally, it must once again be pointed out that the suitability of the method and the apparatus 200 according to one of the embodiments and examples described is not restricted to use for PROFINET IRT networks. For example, it may also be expedient to have the logical configuration in the controller generated by the controller program for PROFINET RT networks. Optionally, the specification of the desired topology by the controller and the checking of the desired topology can also be expedient for PROFINET RT networks, especially when a subsequent calculation of IRT communications parameters is not necessary.

What is claimed is:

1. An apparatus for data processing comprising:
    an engineering system device that exchanges data with at least one further node device to which the apparatus, constituting the first node device, is connectable via a PROFINET network, wherein:
    a control unit that configures the at least one further node device with regard to exchanging data via the PROFINET network in accordance with a desired state,
    the desired state comprises a desired topology, the desired topology being generated by the control unit with regard to a set of configuration-related information for the particular variant of a modular system or machine, and which enables an actual comparison of the desired and an actual state and therefore the detection of errors,
    wherein the set of configuration-related information includes specific information that describes each node device in detail, and wherein the specific information includes at least one of:
        (i) a unique identifier of each node device,
        (ii) data pertaining to device type and manufacturer of each node device,
        (iii) a functional description of each node device,
        (iv) a definition of process data of each node device, and
        (v) a unique designation of each network interface and respective network interface type of each node device;
    the control unit generates in response to at least one item of configuration-related information specified by an operator, a set of configuration data which are necessary for configuring the at least one further node device and the control unit transmits at least a subset of this generated set of configuration data to the at least one further node device via the PROFINET network,
    said control unit is programmed to configure the at least one further node device with regard to physical aspects of the data exchange via the PROFINET network,
    the set of configuration data generated and required for configuring the at least one further node device with regard to the physical aspects includes the desired topology for the PROFINET network; and
    the control unit checks the generated desired topology with regard to the present actual topology; and
    a display that presents the generated desired topology with regard to the present actual topology.

2. The apparatus as claimed in claim 1, wherein the at least one item of configuration-related information is specifiable by the operator using a human-machine interface associated with the control unit.

3. The apparatus as claimed in claim 2, wherein the at least one item of configuration-related information is specifiable by the operator by an operating unit with an input and output that is connected to the control unit.

4. The apparatus as claimed in claim 1, wherein said control unit is programmed to configure the at least one further node with regard to logical aspects of the data exchange via the network.

5. The apparatus as claimed in claim 1, further designed for a cyclic exchange of data via the network.

6. The apparatus as claimed in claim 1, further designed for a real-time exchange of data via the network, wherein the control unit is programmed to configure the at least one further node with regard to a real-time exchange of data via the network.

7. The apparatus as claimed in claim 1, further designed for a clock-synchronous exchange of data via the network, wherein the control unit is programmed to configure the at least one further node with regard to a clock-synchronous exchange of data via the network.

8. The apparatus as claimed in claim 1, wherein the set of configuration data generated and required for configuring the at least one further node includes a set of IRT-specific parameters calculated by the control unit.

9. The apparatus as claimed in claim 1, wherein
said control unit reads the set of configuration-related information from the network and/or from the at least one further node,
said control unit generates the set of configuration data required for configuring the at least one further node based on the read set of configuration-related information, and
in response to at least one item of configuration-related information specified by the operator, transmits at least a subset of the generated set of configuration data to the at least one further node via the network.

10. The apparatus as claimed in claim 1, wherein said control unit initially checks the set of configuration data generated and required for configuring the at least one further node for plausibility per se before said control unit transmits at least a subset of the generated set of configuration data to the at least one further node via the network.

11. The apparatus as claimed in claim 1, wherein said control unit initially checks the set of configuration data generated and required for configuring the at least one further node for plausibility with regard to the actual state of the network and the at least one further node before said control unit transmits at least a subset of the generated set of configuration data to the at least one further node via the network.

12. The apparatus as claimed in claim 1, wherein said control unit is programmed to configure itself by at least a subset of the generated set of configuration data with regard to the exchange of data via the network.

13. The apparatus as claimed in claim 1, wherein said control unit is programmed, after configuring, to control the at least one further node, and wherein the control unit is a programmable logic controller.

14. A non-transitory data medium with a program code stored thereon,
which when executed by an apparatus, causes a control unit to be programmed with the program code, the program code comprising:
exchanging data with at least one further node to which the apparatus, itself constituting the first node, is connectable via a network, wherein:
configuring by an engineering system device the at least one further node with regard to exchanging data via the network in accordance with a desired state,
the desired state comprises a desired topology, the desired topology being generated by the control unit with regard to a set of configuration-related information for the particular variant of a modular system or machine, and which enables an actual comparison of the desired and an actual state and therefore the detection of errors, wherein the set of configuration-related information includes specific information that describes each node in detail, and wherein the specific information includes at least one of:
(i) a unique identifier of each node,
(ii) data pertaining to device type and manufacturer of each node,
(iii) a functional description of each node,
(iv) a definition of process data of each node, and
(v) a unique designation of each network interface and respective network interface type of each node;
the control unit generates in response to at least one item of configuration-related information specified by an operator, a set of configuration data which are necessary for configuring the at least one further node and the control unit transmits at least a subset of this generated set of configuration data to the at least one further node via the network,
said control unit is programmed to configure the at least one further node with regard to physical aspects of the data exchange via the network,
the set of configuration data generated and required for configuring the at least one further node with regard to the physical aspects includes the desired topology for the network; and
the control unit checks the generated desired topology with regard to the present actual topology; and
displaying the generated desired topology with regard to the present actual topology.

* * * * *